Aug. 28, 1923.
T. H. RUSHTON
1,466,550
RESILIENT WHEEL FOR MOTOR AND OTHER LIKE VEHICLES
Filed Dec. 1, 1922
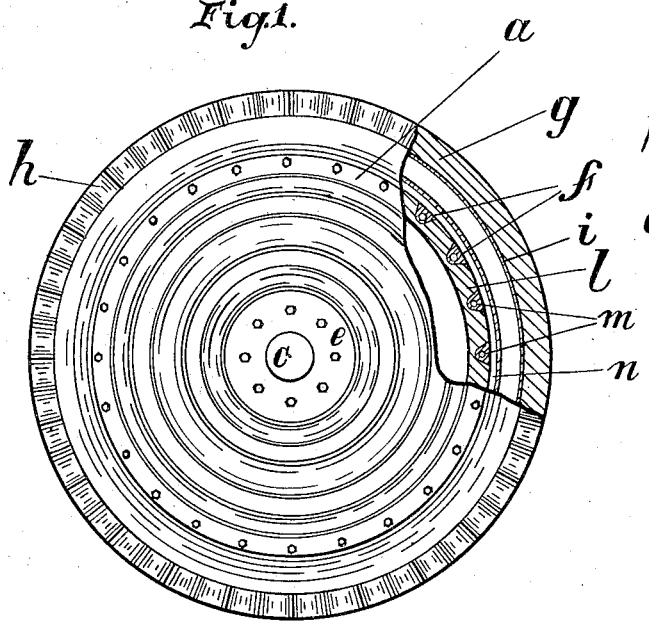
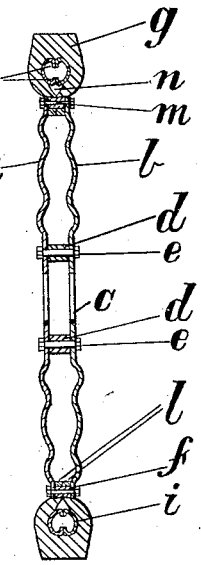
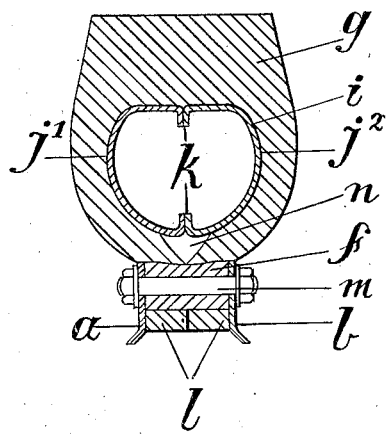
Witnesses
E. H. Bayly
W. Bayly
Inventor
Thomas Henry Rushton,
per J. P. Bayly,
Attorney Patented Aug. 28, 1923.

1,466,550

UNITED STATES PATENT OFFICE.

THOMAS HENRY RUSHTON, OF BIRMINGHAM, ENGLAND.

RESILIENT WHEEL FOR MOTOR AND OTHER LIKE VEHICLES.

Application filed December 1, 1922. Serial No. 604,403.

*To all whom it may concern:*

Be it known that I, THOMAS HENRY RUSHTON, a British subject, residing at The Grove, Chester Road, Erdington, Birmingham, in the county of Warwickshire, England, have invented Improvements in Resilient Wheels for Motor and Other like Vehicles, of which the following is a specification.

This invention relates to an improved unpuncturable, unburstable resilient wheel applicable to motor and other like vehicles, including motor cycles, cycles, motor busses, and motor lorries, charabancs or other heavy vehicles, and has for its object to provide a disc wheel wherein the wheel is resiliently suspended from a tubular steel hoop embedded in the tyre.

A further object of my invention is to provide a resilient wheel where shocks from the road when passing over an undulated surface is absorbed by the wheel instead of the motor or other like vehicle.

A further object of my invention is to provide a tyre which possesses a high degree of resiliency, whereby the motor or other like vehicle is entirely suspended in rubber.

A still further object of my invention is to provide a resilient wheel which may be easily and efficiently fitted to any of the aforesaid existing vehicles.

My invention consists of two metal discs spaced apart around the hub by means of metallic distance pieces through which bolts pass, and at their periphery by a number of distance blocks with a transverse orifice for securing the discs in position and suspended by a tyre by means of bolts as hereinafter described.

Interposed between the aforesaid discs I mount a tyre of bifurcated formation with a tread of substantial thickness containing an endless tubular steel hook embedded therein, said tyre has an inwardly projecting flange integral with the side walls, and provided with apertures of a corresponding shape to the distance blocks for receiving the latter whereby the discs are suspended in the tyre.

The discs are of the circular fluted or corrugated structure. If preferable the said discs may be of any suitable contour.

The distance blocks are of a triangular transverse section with the vertex rounded off and directed toward the axis of the wheel, thus presenting rounded saddle ridges to the pull of the rubber or other material underlying and surrounding the blocks and constituting the centrally directed or base ridge of the hoop containing tyre.

When the above described tyre is mounted in the metal discs, an annular cavity is formed immediately at the base of the endless steel tube, which cavity provides for free movement of the said tube, and also provides for easy compression of the rubber at the nearest point of traction, providing a high degree of resiliency to the tyre.

The load on the wheel through the discs and distance blocks is suspended from the base flange of the tyre at the upper portion of the wheel. The material composing the tyre at this situation is suspended from the upper portion of the steel hoop, which latter being rigid transmits the thrust to the lower portion of the tyre where it bears upon the tread portion thereof in contact with the ground. Thus there is resilient suspension in conjunction with resilient compression.

The tread is preferably moulded with radial corrugations, consisting of lateral semicircular convexities symmetrical on both sides of the wheel, this form giving lateral asperities which are retained in spite of peripheral wear of the tread surface.

Although I have described my invention having a tyre with corrugations on the side walls, I may if preferred provide any other suitable design.

If desired I may provide the tyre with a flat flexible steel band mounted in the inwardly projecting rubber flanges, as further support to the rubber flanges; and as assistance in counteracting lateral strain.

In the accompanying drawings Fig. 1, is a side elevation partly in section of the resilient wheel; Fig. 2, is a half section transverse to the axis of the wheel; and Fig. 3, is an enlarged transverse section of the tyre.

My invention is constructed from two metallic discs, $a$ and $b$, spaced apart at the hub $c$, by winged metallic distance pieces $d$, radially disposed, and secured between the said discs $a$ and $b$, by means of bolts $e$, and around the periphery by distance blocks $f$, as shewn in Fig. 2.

A tyre $g$, of bifurcated formation, with partially radial corrugated side walls $h$, having a tread of substantial thickness, has an endless tube $i$, embedded therein, said tube $i$, consists of two strips of sheet metal $j^1$, and $j^2$, stamped or forged to the required contour, and the respective ends projecting inwardly forming a rib $k$, are soldered or welded together as shewn in Figs. 2 and 3.

The side walls $i$, of the tyre $g$, are moulded with an inwardly projecting flange $l$, having a number of equidistant apertures of a corresponding shape to the aforesaid distance blocks $f$, for receiving the latter, which are of a triangular shape as hereinbefore described.

The inwardly projecting flange $l$, and distance blocks $f$, are interposed between the discs $a$, and $b$, and are rigidly held thereto by means of bolts $m$, and an annular cavity $n$, is formed below the endless tube $j$, providing for the free movement of the tubular ring and easy compression of the rubber near the point of traction, as shewn in Figs. 1, 2 and 3.

From the foregoing description it will be readily understood how my improved wheel is resiliently suspended by the tyre.

I do not wish to be limited to the exact details of construction as herein shewn, as these may be varied within the limits of the appended claims without departing from the spirit of my invention.

I claim:

1. A resilient wheel for motor and other like vehicles, including motor cycles, cycles, motor busses, and motor lorries, charabancs, or other heavy vehicles, having two metal discs forming the wheel which is resiliently suspended from a tubular steel ring embedded in a tyre of bifurcated formation with a tread of substantial thickness, inwardly projecting flanges integral with the side walls of the tyre, apertures for receiving the triangular shaped distance blocks with the vertex rounded off, and the discs are suspended from the tubular steel ring substantially as described.

2. A resilient wheel for motor and other like vehicles of the character described, having two metal discs forming the wheel which is resiliently suspended from an endless tubular steel hoop embedded in a tyre of bifurcated formation with a tread of substantial thickness, inwardly projecting flanges integral with the side walls of the tyre, an annular cavity immediately below the steel hoop providing free movement of the said hoop, and for easy compression of the rubber at the nearest point of traction, the tyre mounted in the discs by triangular shaped distance blocks and bolts substantially as described.

THOMAS HENRY RUSHTON.